(12) United States Patent
Shimamura

(10) Patent No.: US 12,108,255 B2
(45) Date of Patent: Oct. 1, 2024

(54) CONTROL SYSTEM

(71) Applicant: Mitsubishi Electric Corporation, Tokyo (JP)

(72) Inventor: Koji Shimamura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 276 days.

(21) Appl. No.: 17/696,479

(22) Filed: Mar. 16, 2022

(65) Prior Publication Data

US 2022/0360992 A1 Nov. 10, 2022

(30) Foreign Application Priority Data

May 6, 2021 (JP) .................................. 2021-078319

(51) Int. Cl.
*H04W 12/122* (2021.01)
*G07C 5/00* (2006.01)
*G07C 5/08* (2006.01)

(52) U.S. Cl.
CPC .......... *H04W 12/122* (2021.01); *G07C 5/008* (2013.01); *G07C 5/0816* (2013.01)

(58) Field of Classification Search
CPC ................ G05B 23/02; G05B 23/0213; G05B 2219/24065; B60R 16/02; G06F 11/00; G06F 21/552; G06F 21/554; H04W 12/122; G07C 5/0816
USPC ......................................................... 726/23
See application file for complete search history.

(56) References Cited

U.S. PATENT DOCUMENTS

| 6,243,627 B1* | 6/2001 | Ozeki ................. F02D 41/2487 |
| | | 701/29.2 |
| 10,932,135 B2* | 2/2021 | Han ..................... H04W 12/108 |
| 2005/0203646 A1* | 9/2005 | Makino .................... G05B 9/02 |
| | | 701/41 |
| 2017/0088164 A1* | 3/2017 | Kobayashi .......... G06F 11/0757 |
| 2018/0102054 A1* | 4/2018 | Naserian .......... H04W 56/0035 |
| 2018/0131538 A1* | 5/2018 | Ando ................. H04L 12/40163 |
| 2018/0316680 A1* | 11/2018 | Kishikawa .......... H04L 63/1425 |
| 2020/0273267 A1* | 8/2020 | Takahashi ............... G06F 11/22 |
| 2020/0282981 A1* | 9/2020 | Wang ...................... B60Q 9/008 |
| 2020/0361478 A1* | 11/2020 | Sakamoto ................ G05B 9/02 |
| 2020/0413264 A1* | 12/2020 | Han ..................... H04W 12/122 |
| 2021/0001866 A1* | 1/2021 | Yoshimura ............ B60W 40/08 |
| 2022/0080904 A1* | 3/2022 | Fujita ...................... H04L 67/12 |
| 2022/0095115 A1* | 3/2022 | Shimizu ............. H04W 12/104 |
| 2022/0182402 A1* | 6/2022 | Leslie .................... G06F 18/231 |
| 2022/0248196 A1* | 8/2022 | Avedisov .............. B60W 40/02 |
| 2022/0300612 A1* | 9/2022 | Yamamoto .............. G06F 21/85 |

FOREIGN PATENT DOCUMENTS

WO WO-2019159615 A1 * 8/2019

\* cited by examiner

*Primary Examiner* — Sargon N Nano
(74) *Attorney, Agent, or Firm* — Sughrue Mion, PLLC; Richard C. Turner

(57) ABSTRACT

A control system for preventing abnormal operation including the storage of execution time input and output values, the storage of normal time read and write information of an address contained in a pre-defined address range, and the determination of abnormality based on comparison between execution time and normal time information.

20 Claims, 8 Drawing Sheets

FIG. 8A

| | DURING STATE OF RUNNING | | DURING STATE OF PARKING | |
|---|---|---|---|---|
| EXECUTION ORDER | ADDRESS 1 STORE INSTRUCTION → LOAD INSTRUCTION → STORE INSTRUCTION → LOAD INSTRUCTION | ADDRESS 1 STORE INSTRUCTION → LOAD INSTRUCTION → STORE INSTRUCTION → LOAD INSTRUCTION | ADDRESS 1 STORE INSTRUCTION → LOAD INSTRUCTION → STORE INSTRUCTION → LOAD INSTRUCTION | ADDRESS 1 STORE INSTRUCTION → LOAD INSTRUCTION → STORE INSTRUCTION → LOAD INSTRUCTION |
| EXECUTION TIMING | ADDRESS 1 STORE INSTRUCTIONS 10 ms IN-BETWEEN, LOAD INSTRUCTIONS 10 ms IN-BETWEEN | | ADDRESS 1 STORE INSTRUCTIONS 100 ms IN-BETWEEN, LOAD INSTRUCTIONS 100 ms IN-BETWEEN | |

VALUE:

LOAD INSTRUCTION (during running)

| AD-DRESS 1 | AD-DRESS 2 | AD-DRESS 1 | AD-DRESS 2 | AD-DRESS 1 | AD-DRESS 2 | AD-DRESS 1 | AD-DRESS 2 |
|---|---|---|---|---|---|---|---|
| A | B | A1 | B1 | A1 | B1 | A2 | B2 |
| B | /// | B1 | /// | B1 | /// | B2 | |
| C | /// | C1 | /// | C1 | /// | C2 | |

STORE INSTRUCTION (during running)

| AD-DRESS 2 | |
|---|---|
| AD-DRESS 3 | |

LOAD INSTRUCTION (during parking)

| AD-DRESS 1 | AD-DRESS 2 | AD-DRESS 1 | AD-DRESS 2 | AD-DRESS 1 | AD-DRESS 2 | AD-DRESS 1 | AD-DRESS 2 |
|---|---|---|---|---|---|---|---|
| D | C | D | C | D | C | D | C |
| F | /// | F | /// | F | /// | F | |
| /// | E | E | E | /// | E | /// | E |

STORE INSTRUCTION (during parking)

| AD-DRESS 2 | |
|---|---|
| AD-DRESS 3 | |

FIG. 8B

| WRITE STARTING ADDRESS | ADDRESS 1 | ADDRESS 2 | ADDRESS 3 |
|---|---|---|---|
| WRITE SIZE | SIZE 1 | SIZE 2 | SIZE 3 |

CONTROL SYSTEM

BACKGROUND OF THE INVENTION

Field of the Invention

The disclosure of the present application relates to a control system.

Description of the Related Art

In recent years, it can be found that on-vehicle or onboard systems of an automotive vehicle are connected to a vehicle's exterior device(s) by way of a network(s), so that there arise a risk in which a third party having malicious intent makes unauthorized entry into the onboard system(s) from its outside by way of the network(s). If a third party makes unauthorized entry into the onboard system(s), it is feared that, for example, in an electronic control unit (Electronic Control Unit, ECU) being a control apparatus mounted on a motor vehicle, a stored program(s) is tampered, and the control of the ECU is taken over, so that an accident might be intentionally caused by remote control.

In an onboard system, an abnormality handling method is conceivable in which, even when part of a device malfunctions, abnormality caused by the malfunction is detected, so that ordinary running can be achieved by degenerating a function(s) of the device by means of fail-safe, or by doing the like.

However, as described above, when a mechanism to detect abnormality due to a malfunction is changed by means of unauthorized tampering of a program(s), or when information being a subject matter of abnormality detection is disguised as if the information is of a normal value(s), it becomes difficult to detect an event as an abnormal event which should be primarily determined to be abnormal.

As a technology to protect the security with respect to such considerations, there exist a technology of message authentication, that of a digital signature, and/or the like. However, those belong to technologies to take countermeasures with respect to a known attack scenario, and so, it is not always true that an unknown cyber-security attack can be coped with by those. For example, when communications data is disguised as if the data be a normal value(s), it becomes difficult to detect the data as abnormal data. For this reason, there arises the requirement to monitor not only the communications data, but also the behavior of a motor vehicle or that of an ECU.

As one of the countermeasures against unknown cyber-security attack, there exists a technology of secure boot. However, because of a memory check which is performed at the time of a start-up, a motor vehicle cannot cope with an attack in a case in which the attack is received during the time when the motor vehicle is running. In addition, there arises a problem in that a process work-load becomes larger if a memory is checked at all times during the time when a motor vehicle is running. For dealing therewith, a mechanism is required in which, even when unknown cyber-security attack is received during the time when a motor vehicle is running, abnormality is detected without giving a large quantity of influence to a process work-load of control processing, and the motor vehicle is made being ordinarily capable of running.

In Patent Document 1, it is so stated that abnormality can be detected in a case in which the deviations occur from authorized normal states in process order of a function sequence in an electronic control device or apparatus, an execution condition thereof, execution timing thereof, a control value(s) thereof, and the like.

[Patent Document 1] International Publication No. 2019/159615

However, there arise problems in conventional technologies described in Patent Document 1 as follows.

Although process order of the function sequence and a control value thereof become subject matters, output values between processes of a sequence do not become subject matters to the extent therebetween. In a case in which, due to unknown cyber-security attack, another new process is added to intermediately between processes of a sequence, a control value is outputted through a conventional process according to the sequence, whereas the control value results in being calculated by using a value(s) having been changed due to the another new process having been added therebetween. Such abnormality cannot be detected by means of the process order. In addition, even if a value(s) is changed intermediately during a process of the sequence, the detection cannot be performed when the control value is within a normal range of values.

SUMMARY OF THE INVENTION

The present disclosure of the application concerned has been directed at disclosing technologies for solving those problems as described above, and an object of the disclosure is to obtain a control system capable of detecting abnormality at an early stage by performing determination of abnormality whether it exists or does not exist between processes in calculation processes which calculate a control value (s) for executing control processing of a control apparatus, even when the control apparatus is under the execution of the control processing, and even when unknown cyber-security attack is received during the control processing.

A control system disclosed in the present disclosure of the application concerned comprises: a control unit for executing control processing of a control apparatus; a calculation unit for calculating a control value of the control processing through a plurality of steps of a calculation process; a first storage unit for storing, as execution-time information, an input value being used between steps of a calculation process by the calculation unit and an output value of a result being executed thereby; a second storage unit to which an address of the first storage unit and an address range thereof are defined in advance where a write-in of an input-output value and a read-out thereof are performed with respect to the first storage unit at every respective calculation process by the calculation unit, for storing in advance, as normal time information, write-and-read information of the first storage unit with respect to an address thereof and to an address range thereof each defined in advance; an acquisition unit for acquiring write-and-read information with respect, to an address range defined in advance; a comparison unit for comparing the normal time information obtained by the acquisition unit with the execution-time information obtained thereby; and a determination unit for determining abnormality when the normal time information compared by the comparison unit differs from the execution-time information compared thereby each other.

According to the control system disclosed in the disclosure of the application concerned, even when a control apparatus is under the execution of its control processing, abnormality of the control apparatus due to unknown attack is detected at an early stage, so that the control apparatus can be ordinarily controlled.

BRIEF DESCRIPTION OF THE INVENTION

FIG. 8A and FIG. 8B are diagrams each exemplarily showing normal time information stored in a second storage unit of the control system according to Embodiment 1.

DETAILED DESCRIPTION OF THE INVENTION

Figure 1:
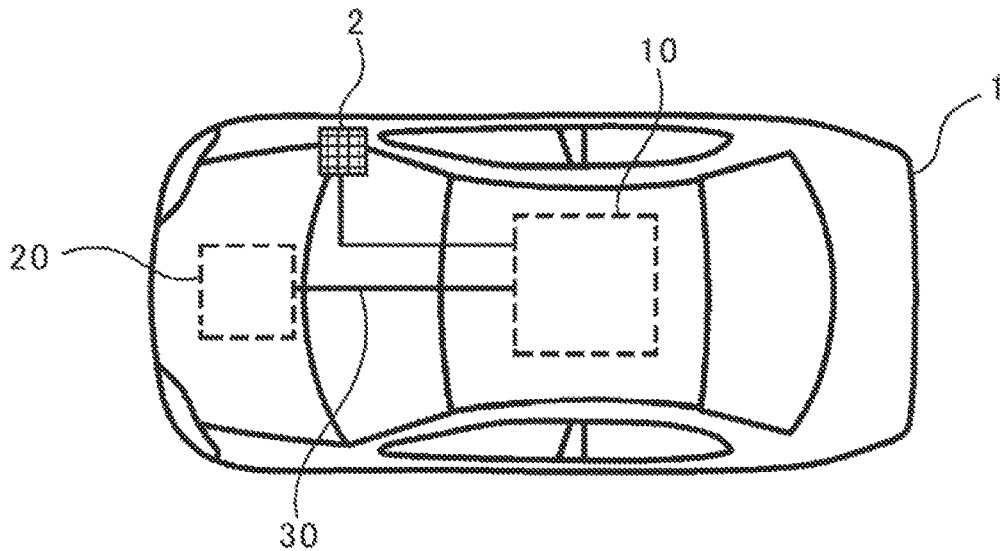
FIG. 1 is diagram illustrating a motor vehicle on which a control system is mounted according to Embodiment 1.

Hereinafter, the explanation will be made referring to the drawings for the exemplary embodiments of control systems disclosed in the disclosure of the application concerned. The explanation will be made in detail, particularly as specific examples of the control systems, for cases in applying control systems of on-vehicle or onboard control apparatus (ECUs) whose control objects or targets are defined as a motor vehicle and its onboard device(s). Note that, in each of the figures, the same and/or corresponding items, portions or parts designate the same reference numerals and symbols.

Embodiment 1

FIG. 1 is diagram for explaining a motor vehicle 1 on which mounted is an ECU (hereinafter, referred to as a "control apparatus" 10) applying thereto a control system according to Embodiment 1. The control apparatus 10 is mounted on the motor vehicle 1 for controlling various kinds of devices (hereinafter, each referred to as a "control target" 2) which are mounted on the motor vehicle 1. The control apparatus 10 may also be connected to another control apparatus 20 mounted on the motor vehicle 1 by way of a communications channel or line 20, for example, via a controller area network (Controller Area Network, CAN bus). As for the control apparatus 20, a control apparatus of electric power steering or the like is conceivable in which, for example, a state such as "running," "turning," "stopping" or the like can be determined by the control apparatus.

Each of the Functions in the Control Apparatus 10

Figure 2:
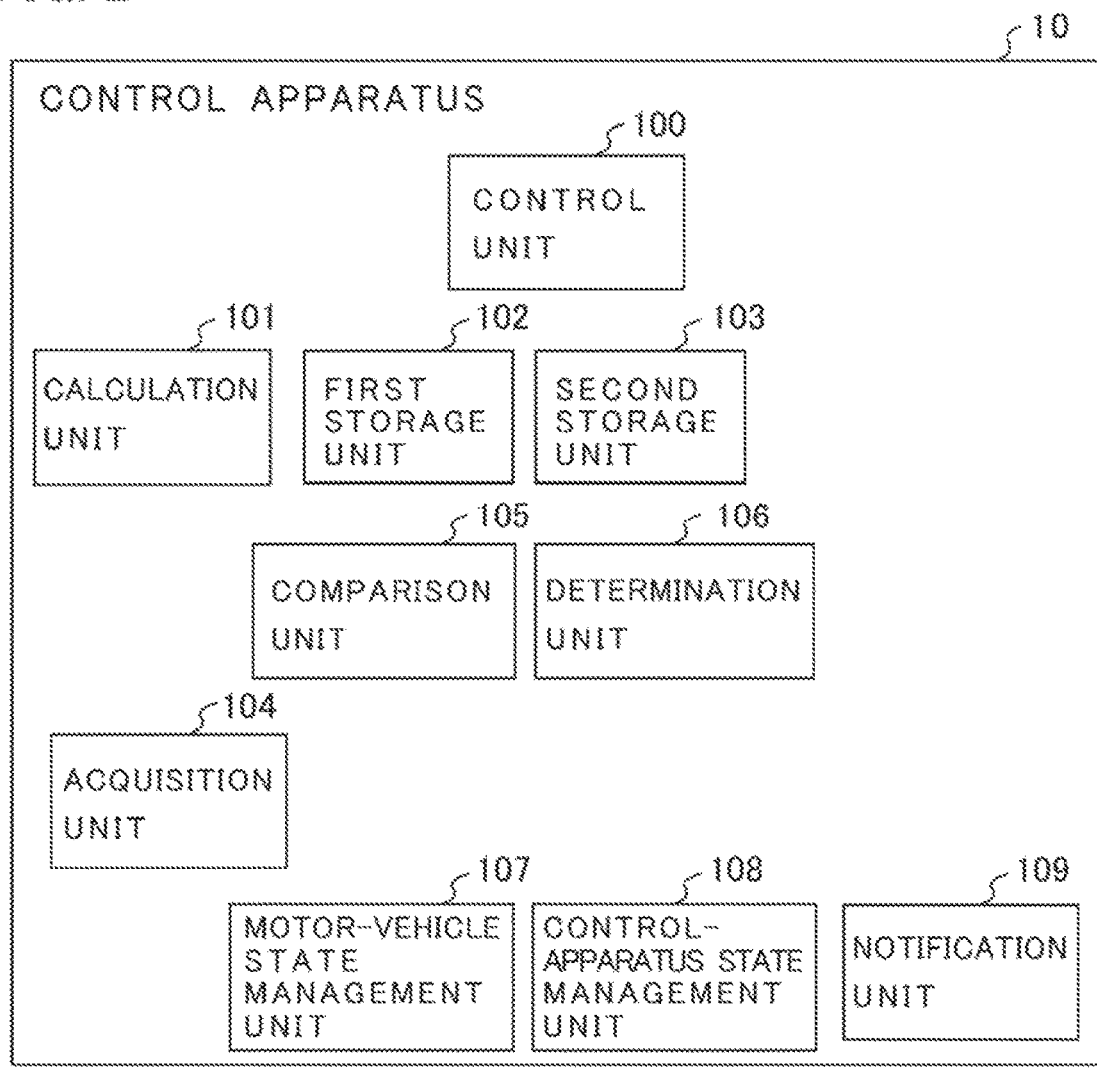
FIG. 2 is a functional block diagram illustrating a control apparatus in the control system according to Embodiment 1.

FIG. 2 is a functional block diagram of the control apparatus 10. The control apparatus 10 comprises a control unit 100, a calculation unit 101, a first storage unit 102, a second storage unit 103, an acquisition unit. 104, a comparison unit 105, a determination unit 106, a motor-vehicle state management unit 107, a control-apparatus state management unit 103, and a notification unit 109. Each of the constituent elements will be described in detail below.

The control unit 100 has a function for controlling the control target 2 mounted inside of the motor vehicle. It may be adopted that there exists one of such control unit 100 with respect to the control apparatus 10, or there exists a plurality of such control units with respect thereto. Note that, a device as the control target 2 shown in FIG. 1 corresponds to an actuator or the like, though the explanation will not be made in detail therefor.

The control unit 100 reads out program data in use for the control corresponding to the control target 2 from a read-only memory (Read-Only Memory, ROM) and from a random access read-write memory (Random Access Memory, RAM) which constitute a storage device, and controls the control target 2 by executing a program(s) having been read out. It may be adopted that a plurality of control methods resides in. For example, in a case under a condition A, a program of a control value X is executed, and, in a case under a condition B, a program of a control value Y is executed.

The calculation unit 101 calculates a control value(s) for use in control processing by the control unit 100. A calculation process for calculating the control value(s) is made of a plurality of steps. In addition, it may be adopted that there exists a plurality of calculation processes for calculating control values. For example, the control value X is calculated through a calculation process C, and the control value Y is calculated through a calculation process D.

The first storage unit 102 is a memory or a storage unit or device in which the calculation unit 101 performs a read-out of an input value from the storage device and a write-in of an output value into the storage device at every one of steps of a calculation process by the calculation unit. In an ordinary case, the first storage unit is made of a random access read-write memory (Random Access Memory, RAM).

The second storage unit 103 stores information used between steps of an operation program(s) at the time of a normal operation of the control unit 100 and at that of a normal operation of the calculation unit 101, and information used between steps of a calculation process at the time of the normal operations, as pieces of the information of:

"write-and-read execution order of sequence with respect to a predetermined address range of the first storage unit 102;

write-and-read execution timing with respect to a predetermined address range thereof;

a write-and-read value(s) with respect to a predetermined address range thereof; and a write starting address with respect thereto and a write size with respect thereto."

The management of a key of cryptograph by means of a hardware security module (Hardware Security Module, HSM) may be performed on ordinary time information or normal time information which is stored in the second storage unit 103. In addition, the storage information may be compressed, or may also be stored as a result in which calculation is added to the storage information for the purpose of security reinforcement. For example, there exist schemes as storing in encrypted information or in hash information, and/or in a message authentication code (Message Authentication Code, MAC).

The acquisition unit 104 monitors a command or instruction register 13 (refer to FIG. 5), as will be described later, at the time of executing control processing, and acquires pieces of execution-time information of:

"write-and-read execution order of sequence with respect to the predetermined address range of the first storage unit 102;

write-and-read execution timing with respect to the predetermined address range thereof;

a write-and-read value(s) with respect to the predetermined address range thereof; and a write starting address with respect thereto and a write size with respect thereto."

The information having been acquired is stored in the first storage unit 102.

The comparison unit 105 compares a value being stored in advance in the second storage unit 103 at the time of a normal operation(s) with a value having been acquired by the acquisition unit 104 at every one of steps of a calculation process at the time of its execution. In addition, the timing for the comparison may be at every one of the steps, or may also be timing wanted to perform the comparison before the time of ending the calculation process.

The determination unit 106 determines abnormality in a case in which comparison results by the comparison unit 105 are not coincident with one another. Namely, it may be so arranged as to determine abnormality, which may be a case in which any one of comparison results is not coincident with one another, or which may also be a case in which a plurality of or all of the comparison results are not coincident with one another, among pieces of the information of:

"write-and-read execution order of sequence with respect to the predetermined address range of the first storage unit 102;

write-and-read execution timing with respect to the predetermined address range thereof;

a write-and-read value(s) with respect to the predetermined address range thereof; and a write starting address with respect thereto and a write size with respect thereto."

When the determination unit 106 determines abnormality, the processing proceeds to an abnormality notification process. When the determination unit determines normality, the control processing of the control unit 100 is continuously executed.

The motor-vehicle state management unit 107 manages an operation state(s) of the motor vehicle 1. As for the operation states, such states can be named that, for example, the motor vehicle 1 "runs," "turns," "stops" and the like. The operation state(s) may be acquired from another control apparatus other than the control apparatus 10, for example, from the control apparatus 20 of FIG. 1.

The control-apparatus state management unit 108 manages a state(s) of the control apparatus 10. As for such states of the control apparatus 10, for example, a state of a power-source voltage, a state during a start-up, a steady control state and the like can be named.

The notification unit 109 notifies information having been determined as abnormal by means of the determination unit 106 toward the outside of the control apparatus 10. Notification contents are notified to an operator or driver by means of an image display screen on a dashboard, or the like. A notification destination may also be a vehicle's exterior notification center. In addition, the notification contents are abnormality information and/or attack information, or a call for attention or the like. It may also be so arranged that the notification contents are displayed on the image display screen of a dashboard in such ways, for example: "Abnormal," "Normal," "Abnormality Has Been Coped with," "Attacked!," "Take Care of the Speed," and/or the like.

Figure 3:
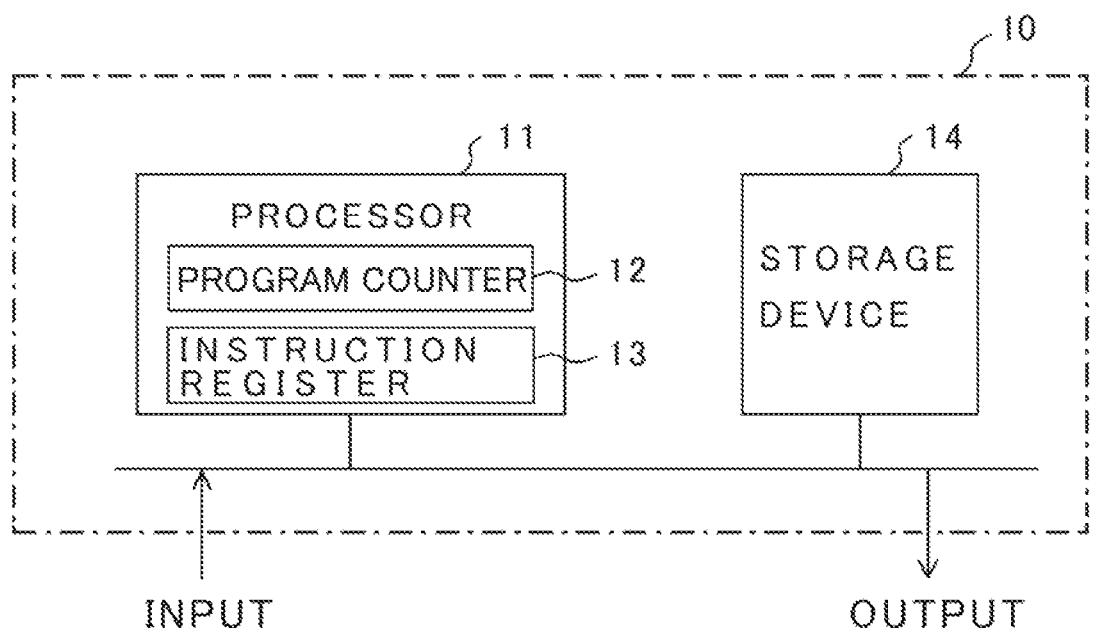
FIG. 3 is diagram illustrating, by way of example, a hardware configuration of the control apparatus in the control system according to Embodiment 1.

An example of the hardware of a microcomputer in the control apparatus 10 is illustrated in FIG. 3. The control apparatus is constituted of a processor 11 and a storage device 14; and the storage device 14 is provided with a volatile storage device of a RAM described above, and with a nonvolatile auxiliary storage device of a ROM described above, or a flash memory or the like, though those memory devices are not shown in the figure. In addition, in place of the flash memory, an auxiliary storage device of hard disk may be provided with. The processor 11 includes a program counter 12 and the instruction register 13, and executes a program(s) inputted from a RAM of the storage device 14 and from a ROM thereof as described above. In this case, an instruction(s) residing at an address(es) of an auxiliary storage device (for example, a ROM) or a volatile storage device (for example, a RAM) at which the program counter 12 points is read out into the instruction register 13, and then the instruction(s) is executed. The processor 11 may store data of a calculation result or the like into a volatile storage device (for example, the RAM) of the storage device 14, or may also store the data into an auxiliary storage device by way of the volatile storage device; and, in addition, an address being targeted for storing is stored in advance in the storage device 14 as a set with a write instruction, which is read out into the instruction register 13, and thereafter, the write instruction is executed with respect to the address having been specified. Among each of the functions of the functional block diagram illustrated in FIG. 2, the functions other than those of the first storage unit 102 and second storage unit 103 may be executed by means of the processor 11; or the functions of the first storage unit 102 and second storage unit 103 may reside within the storage device 14 illustrated in FIG. 3, or portions of the functions of the first storage unit 102 and second storage unit 103 may reside within the processor 11. In addition to these of the hardware, hardware to enhance the security such as a hardware security module (HSM) or the like may also be added to.

Control Processing

Figure 4:
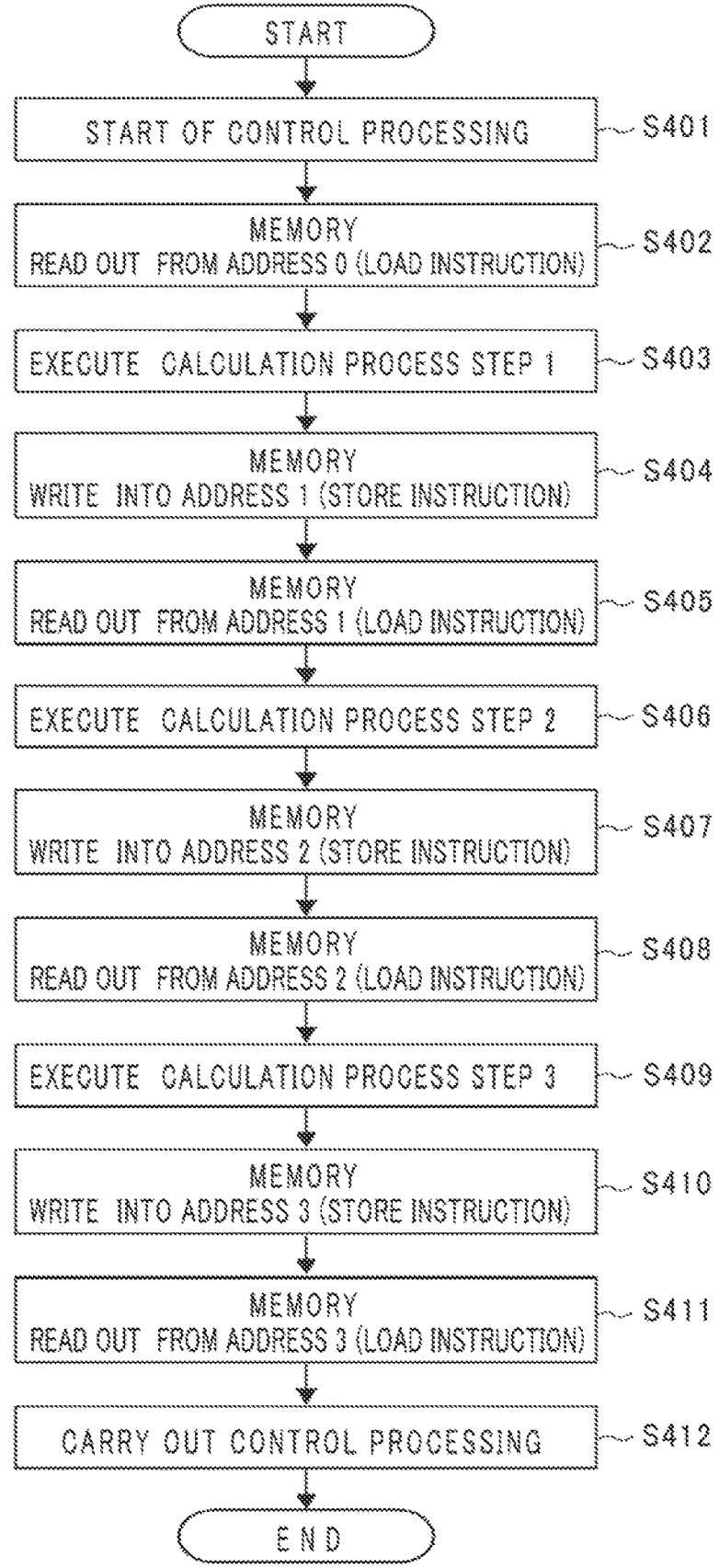
FIG. 4 is a flowchart showing, by way of example, steps of a calculation process in control processing by the control system according to Embodiment 1.

Next, the explanation will be made referring to FIG. 4 in detail for control processing of the control apparatus 10. FIG. 4 is a flowchart showing the flows of processing from the start of control processing by the control unit 100 according to Embodiment 1, and the flows in which a control value(s) is calculated by the calculation unit 101 through a calculation process in three calculation process steps, until the control processing is executed. It is needless to say that the number of steps of the calculation process is not necessarily limited to the three steps.

First, the control unit 100 starts control processing (Step S401). The control processing means those processes, for example, as follows: (1) in order to calculate a control value(s) by the calculation unit 101, detected are various states of a motor vehicle (for example, a malfunction or the like) for controlling the control target 2 from the control apparatus 10 or from the control apparatus 20, or various states from sensors each connected to the control apparatus of those; (2) on the basis of a state of the motor vehicle having been detected, program data in use for the control corresponding to the control target 2 is read out from a ROM of the storage device 14 or a RAM thereof or from the both thereof, and the calculation of a control value(s) for controlling the control target 2 is specified to the calculation unit 101; and the like.

At Step S401, a state of a sensor or the like is detected in accordance with the control processing, and the detected state is stored in a predetermined memory. Here, the memory designates a RAM such as the first storage unit 102.

At Step S402, a load instruction Is executed for reading out, from the memory, sensor information or the like required for a calculation process step 1. Here, it is so arranged that the information is read out from Address 0; however, it is needless to say that, if a plurality of pieces of information is required for the calculation process step 1, the information is read out from a plurality of addresses.

At Step S403, the calculation process step 1 is executed by using the information having been read out at Step S402.

At Step S404, a store instruction is executed for writing a calculation result of the calculation process step 1 into the memory at its predetermined Address 1.

At Step S405, a load instruction is executed for reading out, from the memory, information (sensor information or the like) including the information having been written in Address 1 at Step S404, both of which are required for a calculation process step 2.

At Step S406, the calculation process step 2 is executed by using the information having been read out at Step S405.

At Step S407, a calculation result of the calculation process step 2 is written into the memory at its predetermined Address 2.

At Step S408, a load instruction is executed for reading out, from the memory, information (sensor information or the like) including the information having been written in Address 2 at Step S407, both of which are required for a calculation process step 3.

At Step S409, the calculation process step 3 is executed by using the information having been read out at Step S408.

At Step S410, a calculation result of the calculation process step 3 is written into the memory at its predetermined Address 3.

At Step S411, a load instruction is executed for reading out, from the memory, a result of the calculation process step 3 including the information having been written in Address 3 at Step S410; and then, at Step S412, the control of the control target 2 is carried out by using the result of the calculation process step 3.

Abnormality Detection Processing

Figure 5:
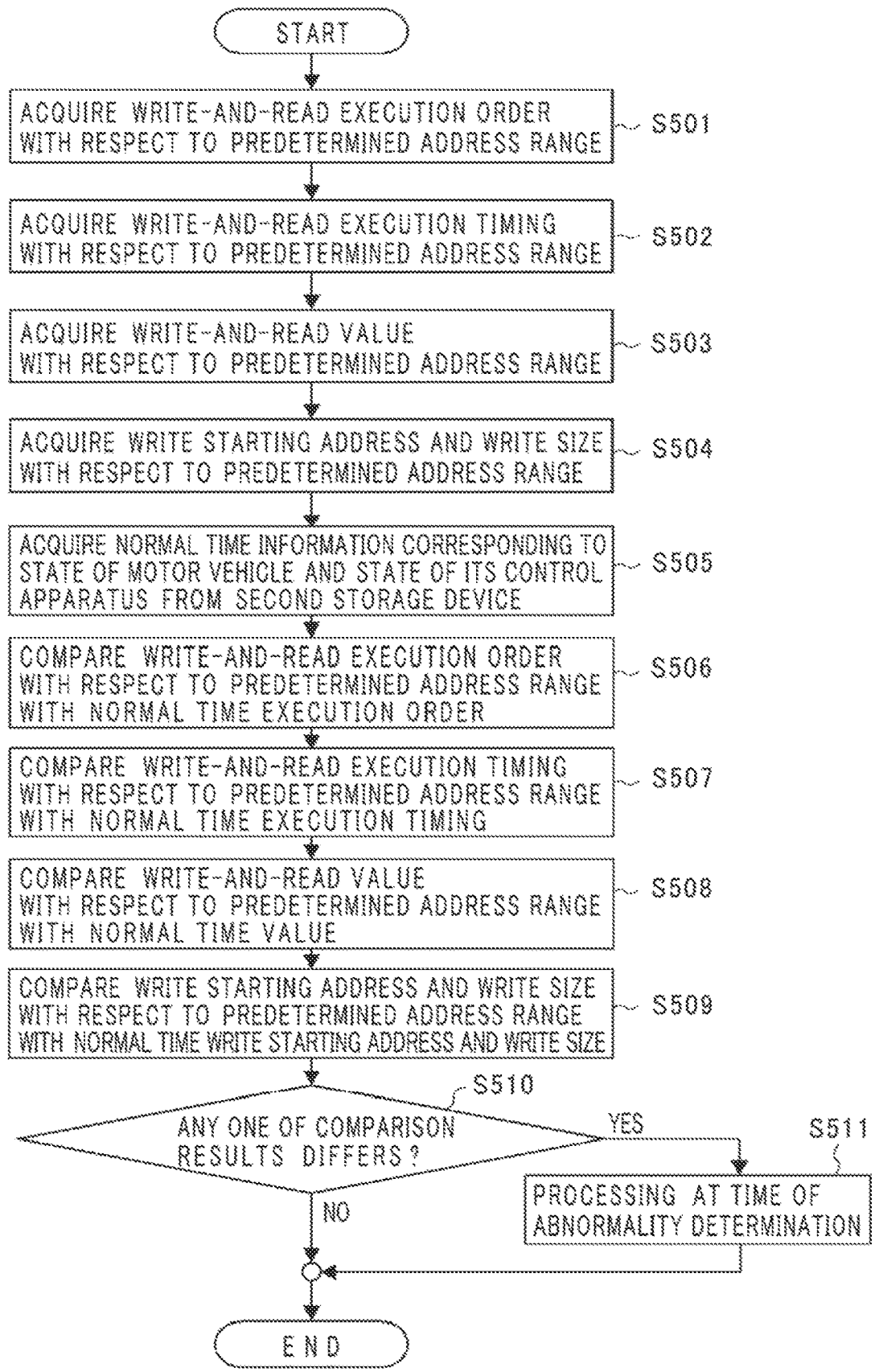
FIG. 5 is a flowchart, for explaining abnormality detection processing at a time of control processing by the control system according to Embodiment 1.

Next, the explanation will be made in detail referring to FIG. 5 for abnormality detection processing. FIG. 5 is a flowchart showing the flows of processing from a start of the control by the control unit 100 according to Embodiment 1, until abnormality is detected.

As shown from Step S401 to Step S411 described above in FIG. 4, the control unit 100 already starts the execution of control processing, so that the calculation unit 101 starts a calculation process for calculating a control value (s) of the control processing.

At Step S501, the acquisition unit 104 monitors the instruction register 13, and acquires write-and-read execution order of sequence with respect to a predetermined address range. Specific examples will be described later.

At Step S502, the acquisition unit 104 monitors the instruction register 13, and acquires write-and-read execution timing with respect to a predetermined address range.

At Step S503, the acquisition unit 104 monitors the instruction register 13, and acquires a write-and-read value(s) with respect to a predetermined address range.

At Step S504, the acquisition unit 104 monitors the instruction register 13, and acquires a write starting address with respect to a predetermined address range and a write size with respect thereto.

Next, at Step S505, the comparison unit 105 acquires from the second storage unit 103 normal time information corresponding to a state of the motor vehicle and a state of its control apparatus.

At Step S506, the comparison unit 105 compares write-and-read execution order of sequence with respect to the predetermined address range with the normal time execution order of sequence described above as the normal time information.

At Step S507, the comparison unit 105 compares write-and-read execution timing with respect to the predetermined address range with the normal time execution timing described above as the normal time information.

At Step S508, the comparison unit 105 compares a write-and-read value(s) with respect to the predetermined address range with the normal time value(s) described above as the normal time information.

At Step S509, the comparison unit 105 compares a write starting address with respect to the predetermined address range and a write size with respect thereto with the normal time write starting address and normal time write size described above as the normal time information, respectively.

At Step S510, the determination unit 106 determines whether or not any one of the comparison results described above is different from one another. When determination is performed so that any one of the comparison results is different from one another (YES), the processing proceeds to Step S511. When all of the comparison results are normal (NO), the processing is ended.

At Step S511, the notification unit 109 functioning as a determination process at a time of abnormality notifies information being determined as abnormal by means of the determination unit 106 toward the outside of the control apparatus 10; and the processing ends at the time of abnormality determination. Notification contents may also be displayed as an alert to an operator or driver by means of an image display screen on a dashboard.

Figure 6:
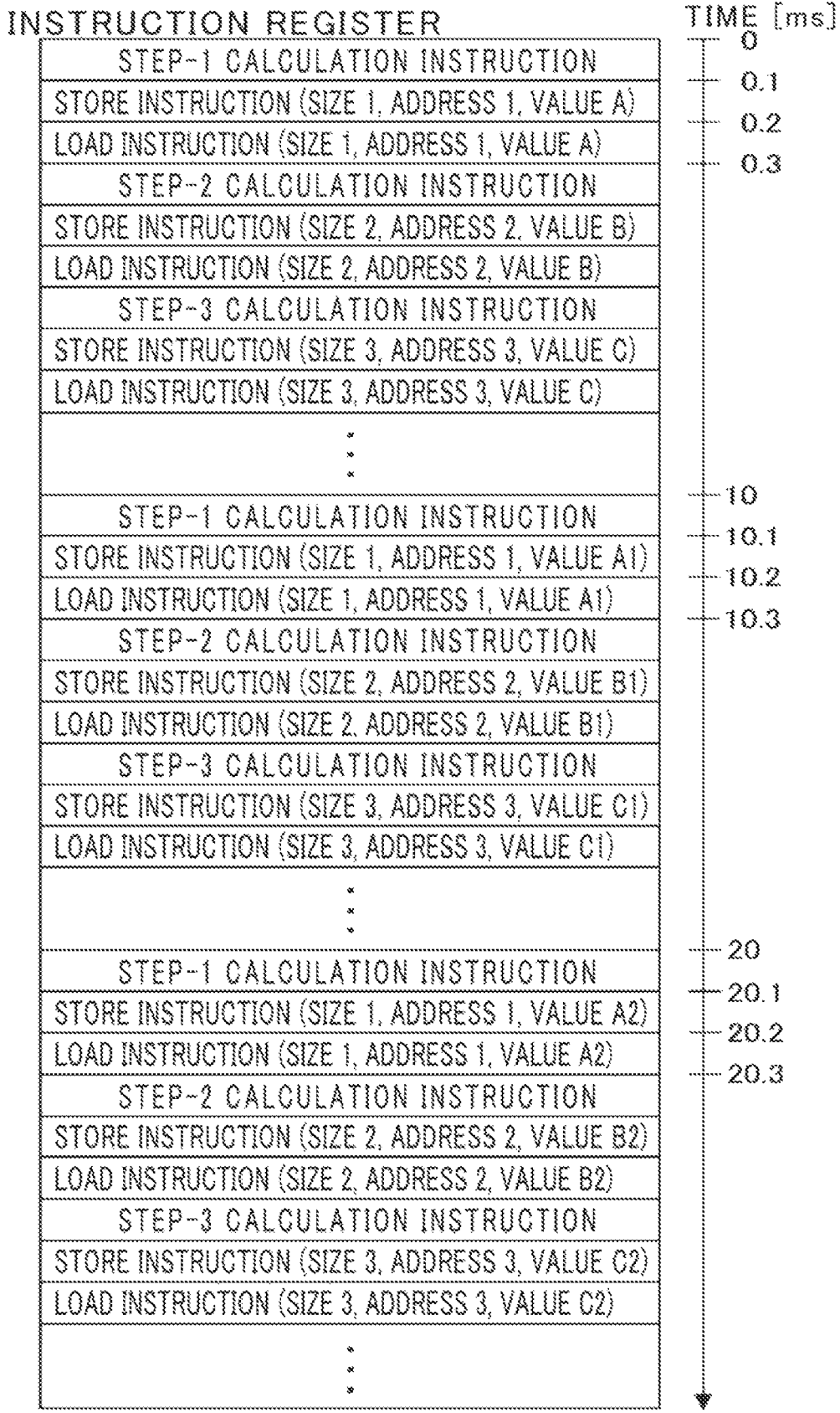
FIG. 6 is a diagram showing the contents of an instruction register in time series at a time of control processing by the control system according to Embodiment 1.

Next, the exemplary explanation will be made referring to specific examples as depicted for the abnormality detection processing. FIG. 6 is a diagram schematically showing three periods of values in the instruction register 13 in time series, when the processing from Step S401 to Step S411 described above in FIG. 4 is executed at a period of 10 ms. Note that, in each of the periods, a time-interval between instruction of a store instruction, a load instruction and the like each is shown in the diagram at 0.1 ms; however, this is because the diagram shows that each of the instructions is sequentially executed, and so, the time-interval is such a value that it changes depending on the performance of the processor 11 or on an external factor(s) thereof.

Figure 7:
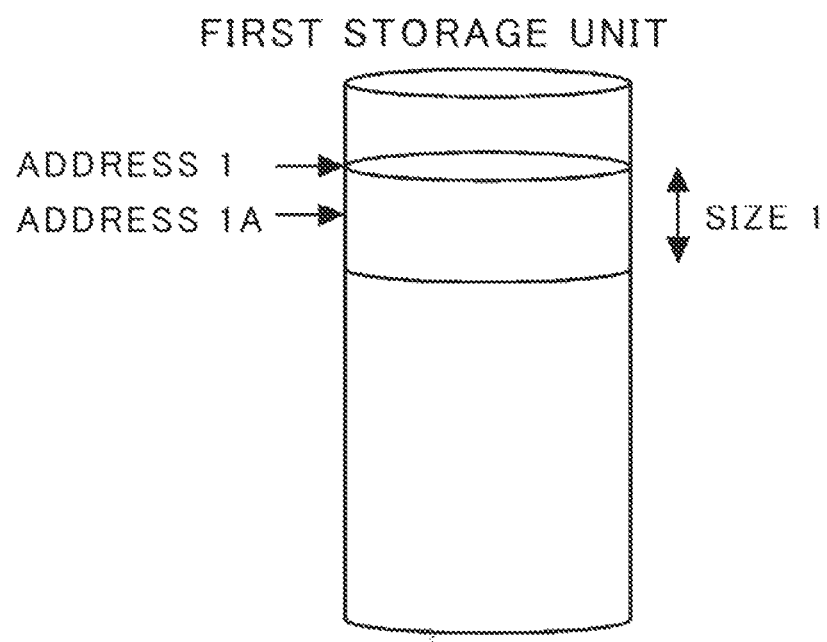
FIG. 7 is diagram illustrating an example of addresses of a first storage unit and that of a size thereof in calculation processes at a tire of control processing by the control system according to Embodiment 1.

In addition, FIG. 7 is a diagram schematically illustrating the first storage unit 102 whose access is made at Step S404 and Step S405. Note that, it is so arranged that the acquisition unit 104 acquires write-and-read information in an address range of Size 1 from Address 1. Address 1A indicates an address which resides within the range of Size 1 from Address 1.

At this time, the acquisition unit 104 acquires information as write-and-read execution order of sequence with respect to a predetermined address range, as taking Address 1 as an example, in the order of sequence: a store instruction (Size 1, Address 1, Value A) at a first period, and a load instruction (Size 1, Address 1, Value A) thereat; a store instruction (Size 1, Address 1, Value A1) at a second period, and a load instruction (Size 1, Address 1, Value A1) thereat; and a store instruction (Size 1, Address 1, Value A2) at a third period, and a load instruction (Size 1, Address 1, Value A2) thereat.

As write-and-read execution timing with respect to the predetermined address range, the information is acquired as an execution time-interval of 10 ms for the store instructions (Size 1, Address 1) in-between, and as an execution time-interval of 10 ms for the load instructions (Size 1, Address 1) in-between.

As for write-and-read values each with respect to the predetermined address range, values are acquired which are written in the first storage unit 102 and are read out therefrom.

As for a write starting address with respect to the predetermined address range and a write size with respect thereto, Address 1 and Size 1 are acquired from the store instructions (Size 1, Address 1) each, respectively.

In the comparison unit 105, first, normal time information is acquired from the second storage unit 103. Respective portions of the normal time information are shown in FIG. 8A and FIG. 8B. Normal time information being acquired from information of the motor-vehicle state management unit 107 and from that of the control-apparatus state management unit 108 is selected (refer to FIG. 8A). When the control unit 100 of the control apparatus 10 and the calculation unit 101 thereof perform their executions, and when pieces of their information are compared during a time of a motor vehicle which is running, execution order of sequence of Address 1 is acquired, for example, for two periods of time as a store instruction→a load instruction→a store instruction→a load instruction; and time-intervals of execution timing of Address 1 are acquired as 10 ms between the store instructions, and as 10 ms between the load instructions. Meanwhile, as for the values, acquired is a list of combinations of a value(s) at a time of a load instruction(s) and a value(s) at the time of a store instruction(s) corresponding to the value(s) of the load instruction(s). The write starting address and the write size are values having been set in advance as shown in FIG. 8B without being related to a state of a motor vehicle or to a state of its control apparatus.

Subsequently, the normal time information having been acquired and information having been acquired by the acquisition unit 104 are compared by the comparison unit with each other. When the information having been acquired by the acquisition unit 104 described above is compared, it is possible to determine as "normal" because any one of those described above is coincident with each other.

Example at Time of Abnormality

Figure 9:
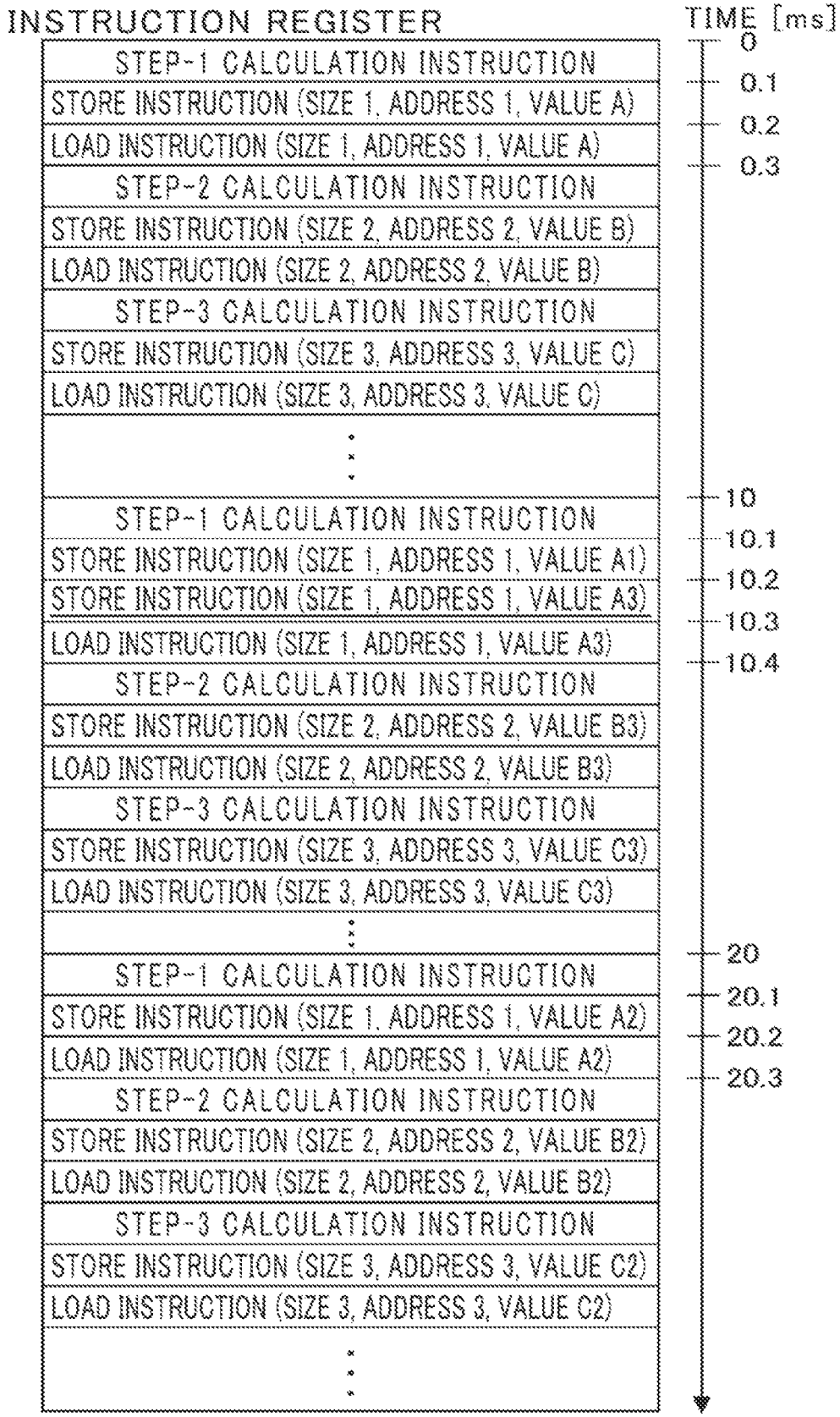
FIG. 9 is a diagram showing the contents of the instruction register in time series at a time when an illegal process is added with respect to control processing by the control system according to Embodiment 1.

The explanation will be made for a case in which values of the instruction register 13 in time series are, if at all, such values as shown in FIG. 9. A store instruction (Size 1, Address 1, Value A3) indicated by the underline is presumed to be an instruction due to unauthorized tampering of a program, or doe to a disguised program.

At this time, in the acquisition unit 104, information is acquired thereby as write-and-read execution order of sequence with respect to a predetermined address range, as taking Address 1 as an example, in the order of: a store instruction (Size 1, Address Value A) at a first period, and a load instruction (Size 1, Address 1, Value A) thereat; a store instruction (Size 1, Address 2, Value A1) at a second period, a store instruction (Size 1, Address 1, Value A3) thereat, and a load instruction (Size 1, Address 1, Value A3) thereat; and a store instruction (Size 1, Address 1, Value A2) at a third period, and a load instruction (Size 1, Address 1, Value A2) thereat.

As write-and-read execution timing with respect to the predetermined address range, the information is acquired as an execution time-interval of 10 ms for the load instructions (Size 1, Address 1) in-between; however, the information is acquired as an execution time-interval of 0.1 ms on this occasion for the store instructions (Size 1, Address 1) in-between with respect to Address 1 because, at the timing of the second period, there exist the store instruction (Size 2, Address 1, Value A1) at a time of 10.1 ms and the store instruction (Size 1, Address 1, Value A3) at a time of 10.2 ms.

Read-out (load) Value A3 with respect to Address 1 and write-in (store) Value B with respect to Address 2 have been acquired.

When these are compared with normal time information having been acquired by the comparison unit 105 as described above, abnormality can be determined because there is no coincidence with the normal time information in relation to the execution order of sequence and the execution timing.

As also for the values, abnormality can be determined because there is no value which is coincident with a normal value of the load instruction, nor that of the store instruction.

As for the normal time values described above, a list is formed by combining a value of a load instruction before each of calculation process steps with a value of a store instruction after the calculation process step corresponding to the value of the load instruction. This is because, at the calculation process step, the calculation is performed by using an input (load instruction) value, and then a calculation result is made as an output (store instruction) value. By forming as the list, it is possible to have normal values of an output value(s) which corresponds to the difference(s) of an input value(s). In addition, it is also possible to have a list of normal values of output values which correspond to a plurality of input values.

Moreover, as for a case in which a state(s) is changed so that a subsequent change is caused at a calculation process step(s), it is only adequate to change over or to transfer normal time information itself in accordance with the state(s). For example, in a case during a state of parking, time-intervals of execution timing each take on as 100 ms between store instructions and as 100 ms between load instructions, whereby both of the time-intervals of the execution timing are taken on as normal time information.

As for the information of states in use for transferring normal time information stored in the second storage unit 103, those states can be named as, for example, "during a state of running," "during a state of parking," "during a state of running on an expressway," or the like. These states are defined in advance at every one of those kinds of states whenever calculation steps of control processing are changed. For example, it is suitable to define transfer states, in a range in which an execution condition of calculation process steps each changes, in such a manner that: when a motor vehicle is in a state of running, a calculation process step 1, a calculation process step 2 and a calculation process step 3 are executed; when the motor vehicle is in a state of parking, only the calculation process step 1 is executed; and, when the motor vehicle is in a state of running on an expressway, the calculation process step 2 and the calculation process step 3 are executed.

In addition, while it is not shown in the figure that, for example, in the instruction register 13, it is possible to determine abnormality of a write address in a case in which a store instruction (Size 2, Address 1, Value A) has been a result. It is also possible to determine abnormality in relation to a write size in a case in which a store instruction (Size 1, Address 1A, Value A) has been a result in the instruction register, for example.

In the embodiment, a write-in with respect to a predetermined address range and a read-out with respect thereto are detected by monitoring the instruction register; however, in place of it, a memory or the storage unit or device may be directly monitored.

Note that, in Embodiment 1 described above, the explanation has been made for an example in which a control system according to the disclosure of the application concerned is implemented as an on-vehicle or onboard control system. However, the control system according to the disclosure of the application concerned is not necessarily limited to this. For example, it is possible to utilize the control system for a control apparatus which has a high level of security strength and, at the same time, which requires a mechanism to detect abnormality of the control apparatus at an early stage of its abnormality.

In accordance with Embodiment 1 described above according to the disclosure of the application concerned, effects can be achieved in the control processing as obtaining those described below.

The configuration to detect abnormality of the control processing is provided by performing the comparison whether or not there exists, in comparison with a normal operation time(s), the coincidence with: write-and-read execution order of sequence with respect to a predetermined address range of the first storage unit in which a calculation process of a control value(s) for use in control processing implements; write-and-read execution timing with respect to the predetermined address range thereof; a write-and-read value(s) with respect to the predetermined address range thereof; and a write starting address with respect to the predetermined address range thereof and a write size with respect thereto. According to this arrangement, without being necessarily limited to a detection method which is especially focused on a control value(s) for the purpose of a control target or on processing order of sequence therefor, abnormality can be detected even when the control value(s) and/or the processing order of sequence are disguised due to unknown cyber-security attack. Moreover, because the comparison is performed, whenever each one of steps of a calculation process is ended, whether or not input-output values between the steps of the calculation process are coincident with each other in comparison with those values at a normal operation time(s), it is possible to detect abnormality of control processing at an early stage before the control processing ends.

In addition, the configuration is provided in which a state of the operations of a motor vehicle and a state of its control apparatus are managed, and, depending on these states of the operations, abnormality is determined by transferring those lists of normal values. According to this arrangement, it becomes possible to determine abnormality in a certain operation state even when determination is performed as normal in another operation state, and thus, it is possible to enhance the degree of detection accuracy on the abnormality. In addition, it becomes possible to withdraw from a monitoring subject matter an address range which is not required to be monitored depending on the operation state, and thus, a process work-load of the abnormality detection processing can be reduced.

Furthermore, the configuration is provided to notify to the outside of a control apparatus the information in which the determination of abnormality is performed on control processing of the control apparatus. According to this arrangement, it is possible to immediately notify to an operator or driver that cyber-security attack has been caused. In addition, the operator or driver to whom the attack is notified can promptly perform inspection of his or her motor vehicle.

In the present application, exemplary embodiments are described; however, various features, aspects and functions described in an embodiment(s) are not necessarily limited to the applications of a specific embodiment(s), but are applicable in an embodiment(s) solely or in various combinations.

Therefore, limitless modification examples not being exemplified can be presumed without departing from the scope of the technologies disclosed in Description of the application. For example, there exists a modification example which is included as a case in which at least one constituent element is modified, added to or eliminated from a constituent element(s) of another embodiment.

What is claimed is:

1. A control system, comprising:
   a controller for executing control processing of a control apparatus, wherein executing the control processing includes controlling operation of a control target;
   a calculation circuitry for calculating a control value of the control processing through a plurality of steps of a calculation process;
   a first storage circuitry for storing, as execution-time information, an input value being used between steps of a calculation process by the calculation circuitry and an output value of a result being executed thereby;
   a second storage circuitry to which an address of the first storage circuitry and an address range thereof are defined in advance where a write-in of an input-output value and a read-out thereof are performed with respect to the first storage circuitry at every respective calculation process by the calculation circuitry, for storing in advance, as normal time information, write-and-read information of the first storage circuitry with respect to an address thereof and to an address range thereof each defined in advance;
   an acquisition circuitry for acquiring write-and-read information with respect to an address range defined in advance;
   a comparator for comparing said normal time information obtained by the acquisition circuitry with said execution-time information obtained thereby; and
   a determination circuitry for determining abnormality when said normal time information compared by the comparator differs from said execution-time information compared thereby each other; wherein
   the controller is configured to adjust operation of the control target based on the determination circuitry determining abnormality.

2. The control system as set forth in claim 1, wherein
   the second storage circuitry stores in advance normal time information of write-and-read execution order with respect to an address range defined in advance for the first storage circuitry being used between steps of a calculation process by the controller;

the acquisition circuitry acquires information of write-and-read execution order with respect to an address range defined in advance; and the determination circuitry determines abnormality when sequences of write-and-read execution order being compared are not coincident with each other.

3. The control system as set forth in claim 1, wherein the second storage circuitry stores in advance normal time information of write-and-read execution timing with respect to a predetermined address range for the first storage circuitry being used between steps of a calculation process by the controller;

the acquisition circuitry acquires information of write-and-read execution timing with respect to an address range defined in advance; and the determination circuitry determines abnormality when time-intervals of write-and-read execution timing being compared are not coincident with each other.

4. The control system as set forth in claim 1, wherein the second storage circuitry stores in advance normal time values of a write-and-read value with respect to a predetermined address range for the first storage circuitry being used between steps of a calculation process by the controller;

the acquisition circuitry acquires a write-and-read value with respect to an address range defined in advance; and the determination circuitry determines abnormality when write-and-read values being compared are not coincident with each other.

5. The control system as set forth in claim 1, wherein the second storage circuitry stores in advance a write starting address for the first storage circuitry and a write size for the first storage circuitry being used between steps of a calculation process by the controller;

the acquisition circuitry acquires a write starting address and a write size at a time when both of which are performed as write-ins with respect to an address range defined in advance; and the determination circuitry determines abnormality when at least either one of write starting addresses being compared and write sizes being compared is not coincident with each other.

6. The control system as set forth in claim 1, further comprising:

a motor-vehicle state management circuitry for managing a state of a motor vehicle; and a control-apparatus state management circuitry for managing a state of the control apparatus, wherein normal time information stored in the second storage circuitry is stored in every one of states of the motor vehicle and in every one of states of the control apparatus; and said normal time information is transferred in accordance with a state of the motor vehicle and with a state of the control apparatus, and is compared with said execution-time information in the determination circuitry.

7. The control system as set forth in claim 2, further comprising:

a motor-vehicle state management circuitry for managing a state of a motor vehicle; and a control-apparatus state management circuitry for managing a state of the control apparatus, wherein normal time information stored in the second storage circuitry is stored in every one of states of the motor vehicle and in every one of states of the control apparatus; and said normal time information is transferred in accordance with a state of the motor vehicle and with a state of the control apparatus, and is compared with said execution-time information in the determination circuitry.

8. The control system as set forth in claim 3, further comprising:

a motor-vehicle state management circuitry for managing a state of a motor vehicle; and a control-apparatus state management circuitry for managing a state of the control apparatus, wherein normal time information stored in the second storage circuitry is stored in every one of states of the motor vehicle and in every one of states of the control apparatus; and said normal time information is transferred in accordance with a state of the motor vehicle and with a state of the control apparatus, and is compared with said execution-time information in the determination circuitry.

9. The control system as set forth in claim 4, further comprising:

a motor-vehicle state management circuitry for managing a state of a motor vehicle; and a control-apparatus state management circuitry for managing a state of the control apparatus, wherein normal time information stored in the second storage circuitry is stored in every one of states of the motor vehicle and in every one of states of the control apparatus; and said normal time information is transferred in accordance with a state of the motor vehicle and with a state of the control apparatus, and is compared with said execution-time information in the determination circuitry.

10. The control system as set forth in claim 4, wherein said normal time values are made of an input value before a step of a calculation process of the calculation circuitry and of an output value after the step thereof, and said normal time values constitute a list of combinations of one or a plurality of said output values corresponding to one or a respective plurality of said input values.

11. The control system as set forth in claim 1, further comprising a notification circuitry for notifying to an outside of the control apparatus information related to abnormality determined by the determination circuitry.

12. The control system as set forth in claim 2, further comprising a notification circuitry for notifying to an outside of the control apparatus information related to abnormality determined by the determination circuitry.

13. The control system as set forth in claim 3, further comprising a notification circuitry for notifying to an outside of the control apparatus information related to abnormality determined by the determination circuitry.

14. The control system as set forth in claim 4, further comprising a notification circuitry for notifying to an outside of the control apparatus information related to abnormality determined by the determination circuitry.

15. The control system as set forth in claim 5, further comprising a notification circuitry for notifying to an outside of the control apparatus information related to abnormality determined by the determination circuitry.

16. The control system as set forth in claim 6, further comprising a notification circuitry for notifying to an outside of the control apparatus information related to abnormality determined by the determination circuitry.

17. The control system as set forth in claim 7, further comprising a notification circuitry for notifying to an outside of the control apparatus information related to abnormality determined by the determination circuitry.

18. The control system as set forth in claim 8, further comprising a notification circuitry for notifying to an outside of the control apparatus information related to abnormality determined by the determination circuitry.

19. The control system as set forth in claim 9, further comprising a notification circuitry for notifying to an outside of the control apparatus information related to abnormality determined by the determination circuitry.

20. The control system as set forth in claim 10, further comprising a notification circuitry for notifying to an outside of the control apparatus information related to abnormality determined by the determination circuitry.

* * * * *